(12) United States Patent
Herr et al.

(10) Patent No.: US 7,418,788 B1
(45) Date of Patent: Sep. 2, 2008

(54) TEMPERATURE SENSITIVE DIPSTICK

(75) Inventors: George Herr, Canton, MI (US); Derek Kinch, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/725,407

(22) Filed: Mar. 19, 2007

(51) Int. Cl.
*G01F 23/04* (2006.01)

(52) U.S. Cl. .......................................... 33/722; 73/295

(58) Field of Classification Search ................... 33/722, 33/729; 73/295
See application file for complete search history.

(56) References Cited

U.S. PATENT DOCUMENTS

| | | | |
|---|---|---|---|
| 3,098,914 A | 7/1963 | Giannino | |
| 3,274,691 A * | 9/1966 | Bolles | 33/702 |
| 4,154,105 A * | 5/1979 | Mackley | 374/142 |
| 4,358,955 A | 11/1982 | Rait | |
| 4,596,141 A | 6/1986 | Kondo | |
| 4,919,983 A * | 4/1990 | Fremin | 428/35.7 |
| 5,323,652 A | 6/1994 | Parker | |
| 5,385,044 A * | 1/1995 | Thomas et al. | 73/295 |
| 5,808,187 A | 9/1998 | Gooden et al. | |
| 6,260,414 B1 | 7/2001 | Brown et al. | |
| 6,301,947 B1 * | 10/2001 | McCombs, Jr. | 72/295 |
| 6,370,952 B1 * | 4/2002 | Little et al. | 73/313 |
| 6,615,658 B2 * | 9/2003 | Snelling | 73/295 |
| 6,761,066 B2 | 7/2004 | Rait | |
| 6,880,396 B2 | 4/2005 | Rait | |
| 6,896,012 B2 | 5/2005 | Wilhelm et al. | |
| 2006/0000103 A1 * | 1/2006 | Nicosia et al. | 33/722 |
| 2007/0264153 A1 * | 11/2007 | Lach, III | 422/56 |

* cited by examiner

*Primary Examiner*—Christopher W Fulton
(74) *Attorney, Agent, or Firm*—David B. Kelley; MacMillan, Sobanski & Todd, LLC

(57) ABSTRACT

A fluid level indicator for determining the level of fluid in a container includes a dipstick that is entered into the fluid in the container and withdrawn from the fluid, a billet of thermochromic material having a reference temperature, a billet length extending along a portion of the dipstick, and a fluid level range marking on the dipstick along the length of the billet.

10 Claims, 1 Drawing Sheet

TEMPERATURE SENSITIVE DIPSTICK

BACKGROUND OF THE INVENTION

1. Field of the Invention

This invention relates generally to determining the level of fluid in a container. More particularly the invention pertains to sensing the temperature of the fluid.

2. Description of the Prior Art

Accurately measuring transmission oil or engine crankcase oil level in a repeatable manner has been challenging because, when the dipstick is pulled out of a fill tube, the oil level is not clearly indicated. An oil film left on the dipstick does not provide a clearly visible demarcation. In addition, the dipstick can contact the side of the fill tube causing oil film to be formed in areas above where the actual oil level is located. This results in a measurement system that does not provide a repeatable, reliable indication of the oil level in the vehicle.

Additionally, transmission oil should be warmed to be about 150° F. before reading the oil level. Often the vehicle operator or service technician has no easy technique way to determine transmission oil temperature without the use of a diagnostic tool. Transmission oil level is very important in automatic transmission function since too much oil may reduce fuel economy and can result in venting fluid. Too little oil degrades function under cold conditions. These constraints often lead to a very tight oil level tolerance (about 0.5 liters), which may be difficult to verify using conventional dipsticks.

There is a need in the industry for a fluid level indicator that responds to fluid temperature and provides clear, reliable, visible indication of fluid level in a confined space, such as a transmission oil sump or an engine crankcase.

SUMMARY OF THE INVENTION

The fluid level indicator employs a heat sensitive material, preferably thermochromic plastic, which changes color at a reference temperature, sometimes called a transition temperature. Thermochromic plastics are available in many different colors, which fade to white above the transition temperature or become transparent above the transition temperature. The fluid level indicator provides a visible indication of the level of fluid in a container that is accurate, repeatable, and easy to use.

A billet, secured to an end of a dipstick, is made of multiple lengths of thermochromic plastic materials, each material selected to transition in color at the reference temperature. A thermal insulator, located between each length, minimizes conductive heat transfer among the lengths along the billet's length.

The billet can then be secured to the indicator end of any dipstick. The middle two sections of the billet's length can represent the mid-range of fluid level specified by the vehicle manufacturer and the outermost sections indicate underfill and overfill fluid levels, respectively. A larger number of billet sections provide increased precision of the indicated fluid level.

The thermochromic plastic indicator provides the user a clear and certain indication of both the oil level and that the fluid has been heated to the proper temperature compatible with the manufacturer's recommendation for reading the oil level.

A fluid level indicator for determining the level of fluid in a container includes a dipstick having a support surface that is entered into the fluid in the container and withdrawn from the fluid, a thermochromic billet secured to the support surface, the billet having a reference temperature, a length extending along a portion of the dipstick, and a width extending across the dipstick, and a fluid level range marking on the dipstick along the length of the strip.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
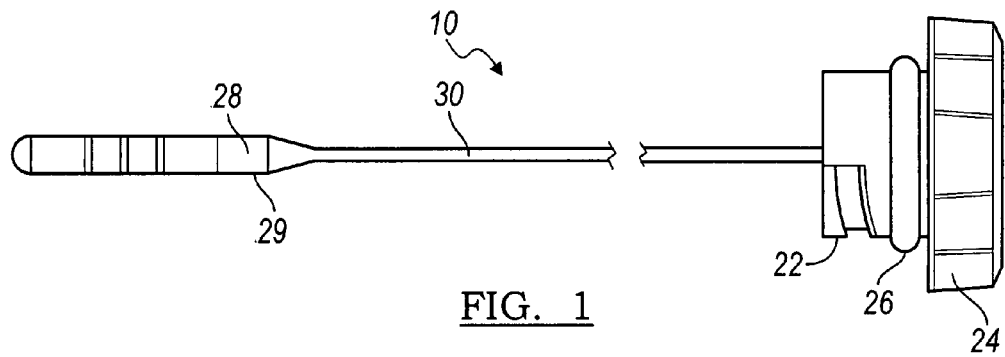
FIG. 1 is a side view of a dipstick for indicating the level of fluid in a sealed housing.
Figure 2:
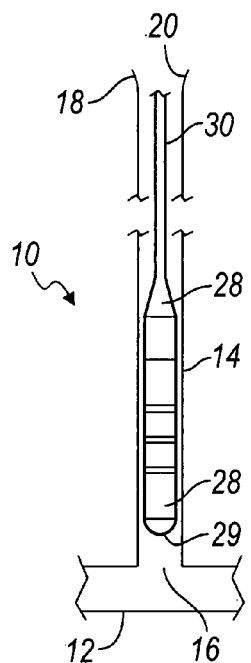
FIG. 2 is side view of a tube into which a length of the dipstick of FIG. 1 is inserted.

FIGS. 1 and 2 illustrates a dipstick assembly 10 in the form of a thin rod that is inserted into a housing 12, such as a transmission case or an engine block, to produce visually on the surface of the dipstick an indication of the level of fluid contained in a oil sump located in the transmission case or in a crankcase located in the engine block. The dipstick 10 is inserted into the case or block 12 through a cylindrical tube 14 secured to a vehicle and having an open lower 16 end that communicates with the case or block and an open upper end 18 formed with a surface 20 that can be engaged by a screw thread 22 formed on the dipstick. Engagement of the screw thread 22 on dipstick 10 with the tube 14 secures the dipstick to the tube such that the lower end of the stick in located in the transmission sump or engine crankcase. A cap 24 on the upper end of the dipstick seats on an end of the tube and compresses a seal 26 against the tube when the dipstick is threaded onto the tube.

Figure 3:
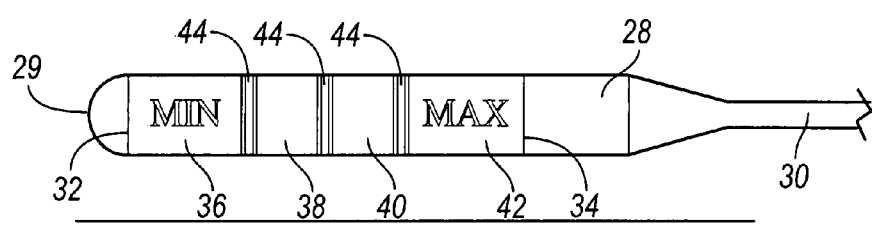
FIG. 3 is a side view of a portion at the tip of the dipstick of FIG. 1.

Referring to FIG. 3, billet 29 is formed with flat surfaces 28 on opposite sides of the billet, which is secured to a lower end of a cylindrical rod portion 30 of the dipstick assembly 10. The billet 29 is formed of plastic containing at least one and preferably multiple theromochromic pigments 36 molded integrally with the plastic and extending along a length of each billet surface 28 from 32 to 34 and across its width. The theromochromic pigments 36 change color along the length of the billet 29 as the temperature of the billet changes in response to the temperature of oil contacting the billet. The theromochromic pigments 36 change color along the length of the billet 29 when the temperature of the billet passes above and below a reference temperature of the respective theromochromic pigments 36, thereby indicating the temperature of the transmission oil.

An appropriate billet 29 of molded plastic may contain theromochromic pigments available commercially from Kelly Chemical Corporation 9F, No. 155, Sec. 1, Keelung Rd, Taipei, Taiwan Thermochromic plastics are available in various colors below a reference temperature, which colors change automatically to white when their temperature becomes substantially equal to or greater than the reference temperature. A preferred reference temperature for this application is about 65° C., i.e., 150° F.

In the embodiment of FIG. 3, surfaces 28 of billet 29 can be formed of four different thermochromic materials 36, 38, 40, 42, each having a characteristic color which changes to a reference color, such as white, at temperatures above 150° F. A thermal insulator 44 extending across the width of surfaces 28 is located between each of the four materials 36, 38, 40, 42 to minimize the effects of conductive heat transfer among the thermochromic materials located on surfaces 28. Any material having a low thermal conductivity (such as a ceramic) can be used as the thermal insulator 44, thereby avoiding temperature increase up the length of the dipstick 10.

In operation, the vehicle operator runs the engine for a period during which the oil temperature increases to a test temperature defined by the vehicle manufacturer as the minimum temperature at which the fluid level should be determined using the dipstick 10. When the billet 29 is inserted into the oil sump, the oil in the sump wets and heats the thermochromic materials 36, 38, 40, 42 on the billet. If the temperature of the oil in the sump is equal to or greater than the minimum defined test temperature, the thermochromic materials wetted by the sump oil change color and become white. Oil on the billet 29 is located on thermochromic materials 36, 38, 40, 42, which will have a color corresponding to the oil temperature. The height of the oil in the sump is indicated by the location on the billet where the color changes. Above the oil height, the temperature of the thermochromic materials 36, 38, 40, 42 that are not wetted by the sump oil will be lower than the reference temperature, and those materials will have the color they had before inserting the dipstick 10 into the sump. Below the oil height, the temperature of the thermochromic materials 36, 38, 40, 42 that are wetted by the sump oil will be greater than the reference temperature, and those materials will have changed color from the color they had before inserting the dipstick 10 into the sump. The volume of the oil in the sump is indicated on the thermochromic materials 36, 38, 40, 42 by a line across the billet produced at the height of oil in the sump.

Alternatively, oil on the billet 29 is located on thermochromic materials 36, 38, 40, 42, which provide a clear background in contrast to the color of the oil. The volume of the oil in the sump is indicated on the thermochromic materials 36, 38, 40, 42 by a line across the billet produced at the height of oil in the sump.

The thermochromic material 36 and 42 on the billet 29 can be molded with abbreviations such as "MIN" and "MAX" to indicate the volume of oil in the sump that corresponds to the location of the oil line on the dipstick, thereby providing a clear, visual indication of the fluid level in a transmission.

The thermochromic material 38, 40 located between materials 36, 42 can be used to represent the specification level of sump oil defined by the vehicle manufacturer, and materials 36. 42 can indicate underfill or overfill oil levels.

More than four thermochromic materials 36, 38, 40, 42 can be used along the length of billet 29, to increase precision. The temperature range of the sump oil can be indicated using a billet 29 containing multiple thermochromic pigments, each having a different reference temperature, at which a color change occurs.

Alternatively, a single thermochromic material 36 can be used along the length of billet 29.

The entire billet 29 may be formed of metal or plastic covered with one or more layers of thermochromic material containing thermochromic pigments, each layer extending a portion of the length of the billet.

In accordance with the provisions of the patent statutes, the preferred embodiment has been described. However, it should be noted that the alternate embodiments can be practiced otherwise than as specifically illustrated and described.

What is claimed is:

1. A fluid level indicator for determining the level of fluid in a container, comprising:
    a dipstick that is entered into the fluid in the container and withdrawn from the fluid;
    a billet secured to the dipstick near an axial end thereof and formed of multiple lengths of thermochromic material containing thermochromic pigment having a reference temperature, at which a color change of the billet length occurs, the billet including a first length of said thermochromic material representing a first range of fluid height in the container, and a second length of said thermochromic material located at a higher elevation on the dipstick than the first length and representing a second range of fluid height in the container greater than the first range; and
    a thermal insulator located on the dipstick between consecutive thermochromic material lengths.

2. The fluid level indicator of claim 1, wherein the billet further comprising:
    a third length of said thermochromic material located at a higher elevation on the dipstick than the second length and representing a range of fluid height in the container greater than the second range.

3. The fluid level indicator of claim 2, further comprising:
    a fourth length of said thermochromic material located at a higher elevation on the dipstick than the third length and representing a range of fluid height in the container greater than the third rang.

4. The fluid level indicator of claim 3, wherein the fourth length represents a maximum range of fluid height in the container.

5. The fluid level indicator of claim 1, wherein the first length represents a minimum range of fluid height in the container.

6. The fluid level indicator of claim 1, further comprising a fluid level range marking on the dipstick along a length of the billet.

7. The fluid level indicator of claim 1, wherein:
    the first length has a first reference temperature and the second strip has a second reference temperature, the first and second lengths having mutually different colors below each respective reference temperature; and
    the first length and the second length have a substantially identical color above each respective reference temperature.

8. The fluid level indicator of claim 1, wherein:
    the first length has a first reference temperature and the second strip has a second reference temperature, the first and second lengths having mutually different colors below each respective reference temperature; and
    the first length and the second length are colorless above each respective reference temperature.

9. The fluid level indicator of claim 1, wherein the billet is formed of plastic containing said thermochromic pigment.

10. The fluid level indicator of claim 1, wherein the billet length is formed of metal covered with material containing thermochromic pigment having a reference temperature, at which a color change of said length material occurs.

* * * * *